UNITED STATES PATENT OFFICE.

WINDELER LOOSE, OF BREMEN, GERMANY.

MEDICAMENT FOR DISEASES OF THE MUCOUS MEMBRANE.

944,738.  Specification of Letters Patent.  Patented Dec. 28, 1909.

No Drawing.  Application filed August 16, 1909.  Serial No. 513,135.

*To all whom it may concern:*

Be it known that I, WINDELER LOOSE, a subject of the German Emperor, and residing at Bremen, Germany, have invented certain new and useful Improvements in Medicaments for Diseases of the Mucous Membrane, Particularly of the Eyes, and a Process for Making the Same, of which the following is a specification.

The subject-matter of my invention is an improved medicament for diseases of the mucous membrane, particularly of the eyes, and a process of making the same.

The employment of zinc sulfate in combination with spirit of wine or the like is well-known in ophthalmology. The action of the zinc sulfate is frequently undesirably severe, for which reason, in order to obtain a milder action, zinc has been bound with other substances, such as acetic acid, carbolic acid, valerianic acid or the like. In order to mitigate this action, and to make available to medicine the good properties of zinc sulfate without its irritating action, according to my invention I use an addition of albumen which envelops the molecule of zinc sulfate and thus keeps off the severe irritating symptoms, whereas it makes the curative action particularly lasting, since the zinc sulfate bound in the new way does not so readily injure the mucous membrane. The action of the preparation is therefore considerably increased although milder. The substances used according to my invention and in part well-known for this purpose are the following: natural pure white wine, ovalbumen, sulfate of zinc and refined cane sugar; namely to a liter of pure white wine I add about 125 grams of ovalbumen, about 4 grams of sulfate of zinc and about 4 grams finely powdered refined cane sugar.

My process of making my improved medicament is as follows: The wine, preferably German Rhine-wine, is first examined exactly as to its natural purity. For obtaining the ovalbumen I boil the hen's egg hard and then carefully remove the shell, yoke and membrane. For the further treatment I use a so-called laboratory press, which is provided with a basin or dish for decanting, and in addition a pressing-bag of coarse linen or canvas. I then put into the bag the albumen of at most one egg, fill the basin half-full with wine, soak the bag containing albumen with wine, squeeze the bag with the press and during the pressing operation dip the bag constantly afresh into the wine. In this manner the albumen, hardened somewhat by the wine, jumps in the form of small grains through the canvas into the wine. After all has been expressed which can pass through, I open the bag and about the fifth part of the albumen is found as a sandy, somewhat hard residue. This hard residue is of no use for the medicament and is thrown away. The expressed albumen is in the wine; I now add the contents of the basin to the principal part of the wine which is to be employed. By this treatment only the finest constituents, so to say the strength of the albumen is employed and the same is made permanently stable. After the product has been made thus far I add the sulfate of zinc and sugar.

It is preferable to make the medicament as in a factory in order to obtain a product absolutely free from objection as is necessary for the treatment of ophthalmic and other diseases.

Instead of sulfate of zinc, chlorate of zinc and sulfate of copper may be used.

My new medicament is suitable for treating ophthalmic diseases, gonorrhea, and all inflammatory processes of the mucous membrane, particularly fluor albus, and others.

The constituents of my medicament may be mixed in another order than that mentioned above, but that described above has proved the best.

I claim:—

1. The hereindescribed process of manufacturing a medicament for diseases of the mucous membrane, which consists in hard boiling a hen's egg and obtaining the albumen therefrom, in treating the albumen thus obtained with wine and simultaneously squeezing the same through small orifices and thereby obtaining granular, very fine particles of the albumen coagulated by boiling, in adding said constituents to wine, and subsequently adding sulfate of zinc and sugar to the mixture thus obtained.

2. The hereindescribed process of manufacturing a medicament for diseases of the mucous membrane, which consists in hard boiling a hen's egg, in adding approximately one hundred and twenty-five grams of granular, very fine particles of the albumen coagulated by boiling to approximately one liter of pure wine, and in subsequently adding to the mixture thus obtained approximately four grams of sulfate of zinc and approximately four grams of finely pulverized cane sugar, substantially as described.

In witness whereof I have hereunto set my hand in presence of two witnesses.

WINDELER LOOSE.

Witnesses:
    FREDERICK HOGERMANN,
    JOHN BOSSE.